United States Patent
Biheller et al.

(10) Patent No.: US 12,290,746 B2
(45) Date of Patent: May 6, 2025

(54) MOBILE GAME CONTROLLER AND FULL FEATURE GAME CONTROLLER COMBINATION DEVICE

(71) Applicant: ACCO BRANDS CORPORATION, Lake Zurich, IL (US)

(72) Inventors: Jason A. Biheller, Lake Zurich, IL (US); Dalin Cienfuegos, Lake Zurich, IL (US); Stephen Mitchell, Lake Zurich, IL (US); Adam Noce, Lake Zurich, IL (US); Ulises Gonzalez, Lake Zurich, IL (US)

(73) Assignee: ACCO BRANDS CORPORATION, Lake Zurich, IL (US)

( * ) Notice: Subject to any disclaimer, the term of this patent is extended or adjusted under 35 U.S.C. 154(b) by 243 days.

(21) Appl. No.: 17/929,918

(22) Filed: Sep. 6, 2022

(65) Prior Publication Data
US 2024/0075381 A1 Mar. 7, 2024

(51) Int. Cl.
*A63F 13/24* (2014.01)
(52) U.S. Cl.
CPC ................... *A63F 13/24* (2014.09)
(58) Field of Classification Search
CPC .......... A63F 13/24; A63F 13/92; A63F 13/98; A63F 13/235; A63F 13/285
See application file for complete search history.

(56) References Cited

U.S. PATENT DOCUMENTS

| | | | | |
|---|---|---|---|---|
| 6,530,570 B2* | 3/2003 | Ku | ........................... | A63F 13/24 273/148 B |
| 6,530,838 B2* | 3/2003 | Ha | ........................... | A63F 13/24 345/169 |
| D548,235 S * | 8/2007 | Krieger | ........................ | D14/401 |
| 7,316,618 B2* | 1/2008 | Hsu | ........................ | A63F 13/245 434/45 |
| 10,894,207 B2* | 1/2021 | Umezu | ............... | H04B 10/1143 |
| 10,898,794 B2* | 1/2021 | Barlet | ..................... | A63F 13/24 |
| 2005/0075172 A1* | 4/2005 | Coleman | .................. | A63F 13/98 463/47 |
| 2006/0279039 A1* | 12/2006 | Krieger | .................... | A63F 13/98 463/36 |
| 2010/0267454 A1* | 10/2010 | Navid | ..................... | A63F 13/24 463/37 |

(Continued)

*Primary Examiner* — David L Lewis
*Assistant Examiner* — Shauna-Kay N. Hall
(74) *Attorney, Agent, or Firm* — Renner, Otto, Boisselle & Sklar, LLP (57) ABSTRACT

A device may include a first unit and a second unit. The first unit may include a first body that has a controller interface that is operatively connected to one or more processors disposed in the first body and configured to operatively connect to a gaming device. The first body may include one or more rumble motors to provide haptic feedback to a user in response to the gaming device. A first communication port may be operatively mounted to the first body and operatively connected to the one or more processors. The second unit may include a second body separate from the first body, one or more second rumble motors operatively installed to the second body, and a second communication port configured to communicatively connect to the first communication port such that the one or more processors effectively controls the one or more second rumble motors.

23 Claims, 7 Drawing Sheets

(56) References Cited

U.S. PATENT DOCUMENTS

| | | | |
|---|---|---|---|
| 2011/0081969 A1* | 4/2011 | Ikeda | A63F 13/235 |
| | | | 463/37 |
| 2012/0122576 A1* | 5/2012 | Mao | A63F 13/245 |
| | | | 463/32 |
| 2014/0221097 A1* | 8/2014 | Plagge | G06F 1/3259 |
| | | | 463/36 |
| 2017/0242486 A1* | 8/2017 | Grant | G06F 3/0338 |

* cited by examiner

MOBILE GAME CONTROLLER AND FULL FEATURE GAME CONTROLLER COMBINATION DEVICE

FIELD OF INVENTION

The present invention relates to video games, in particular to handheld controllers for playing video games.

BACKGROUND

Conventional video game controllers for use with game consoles, mobile devices, and computers are comprised of a rigid solid body controller to be used with both hands. Generally, controllers include a hard outer casing with a plurality of controls mounted about the controller to interface with the desired operating system. In recent years, the gaming industry has pushed towards a demand for gaming to be accessible both at home and on-the-go. This mobile gaming trend has been spurred further along by the advancements in resolution of mobile phones and cloud-based gaming. However, this mobile gaming revolution has not been matched with an advancement in video game controllers that can meet the needs of a gamer who wants to play both at home and on-the-go.

Mobile gaming controllers are mainly configured to interface with a mobile phone, do not commonly provide haptic feedback, and/or are not compatible with both home and on-the-go gaming. Moreover, many of these mobile gaming options would not be desirable to use for at home gaming due to their compact nature. Similarly, at home gaming video game controllers may not be desirable for mobile gaming as they may be clunky and cumbersome to travel with. Therefore, there is a need in the art for a controller that is optimized for use both at home and on-the-go that is compatible with mobile phones, computers, and video game consoles, and has haptic feedback.

SUMMARY OF THE INVENTION

The present disclosure relates to a mobile game controller and full feature game controller combination device. In accordance with an embodiment, the device includes a first unit and second unit. The first unit includes a first body which includes control interfaces comprising at least one analog stick, at least two trigger buttons, at least one action button, at east one directional pad, and one or more first rumble motors operatively installed to the first body. Furthermore, one or more processors may be disposed in the first body and is configured to operatively connect to a gaming device and operative connected to the controller interfaces which receive user input. The user input via the controller interfaces is operatively connected to and controls a video game executed by the gaming device to receive video game feedback and cause the one or more rumble motors to vibrate to provide haptic feedback to the user. The first body also includes a first communication port operatively mounted to the first body and operatively connected to the one or more processors. The second unit includes a second body separate from the first body. One or more second rumble motors are operatively installed to the second body and a second communication port is operatively mounted to the second body. The second communication port is configured to communicatively connect to the first communication port such that the one or more processors effectively controls the one or more second rumble motors to vibrate to provide enhanced haptic feedback to the user.

In one embodiment, the second body of the mobile game controller and full feature game controller combination device has an ergonomically correct shape to accommodate hands of a user.

In one embodiment, the second body has a shape complementary of a shape of the first body such that coupling of the second body to the first body resembles a full feature game controller.

In one embodiment, the first body has a substantially rectangular shape and the second body has an ergonomically correct shape to accommodate hands of a user, and the second body has a shape complementary of the shape of the first body such that coupling of the second body to the first body resembles a full feature game controller.

In one embodiment, the first communication port includes a first electrical connector and the second communication port includes a second electrical connector configured to connect to the first electrical connector.

In one embodiment, the first communication port includes a first wireless communication device and the second communication port includes a second wireless communication device configured to wirelessly connect to the first wireless communication device.

In one embodiment, coupling the first communication port to the second communication port configures the one or more processors to effectively control the one or more second rumble motors to vibrate and coupling the first body to the second body configures the one or more second rumble motors to provide haptic feedback to the user at a higher intensity and/or lower frequency compared to an intensity and/or frequency provided to the user by the one or more first rumble motors alone.

In one embodiment, coupling the first body to the second body causes the one or more processors to initiate control of the one or more second rumble motors and to cease operation of the one or more first rumble motors.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
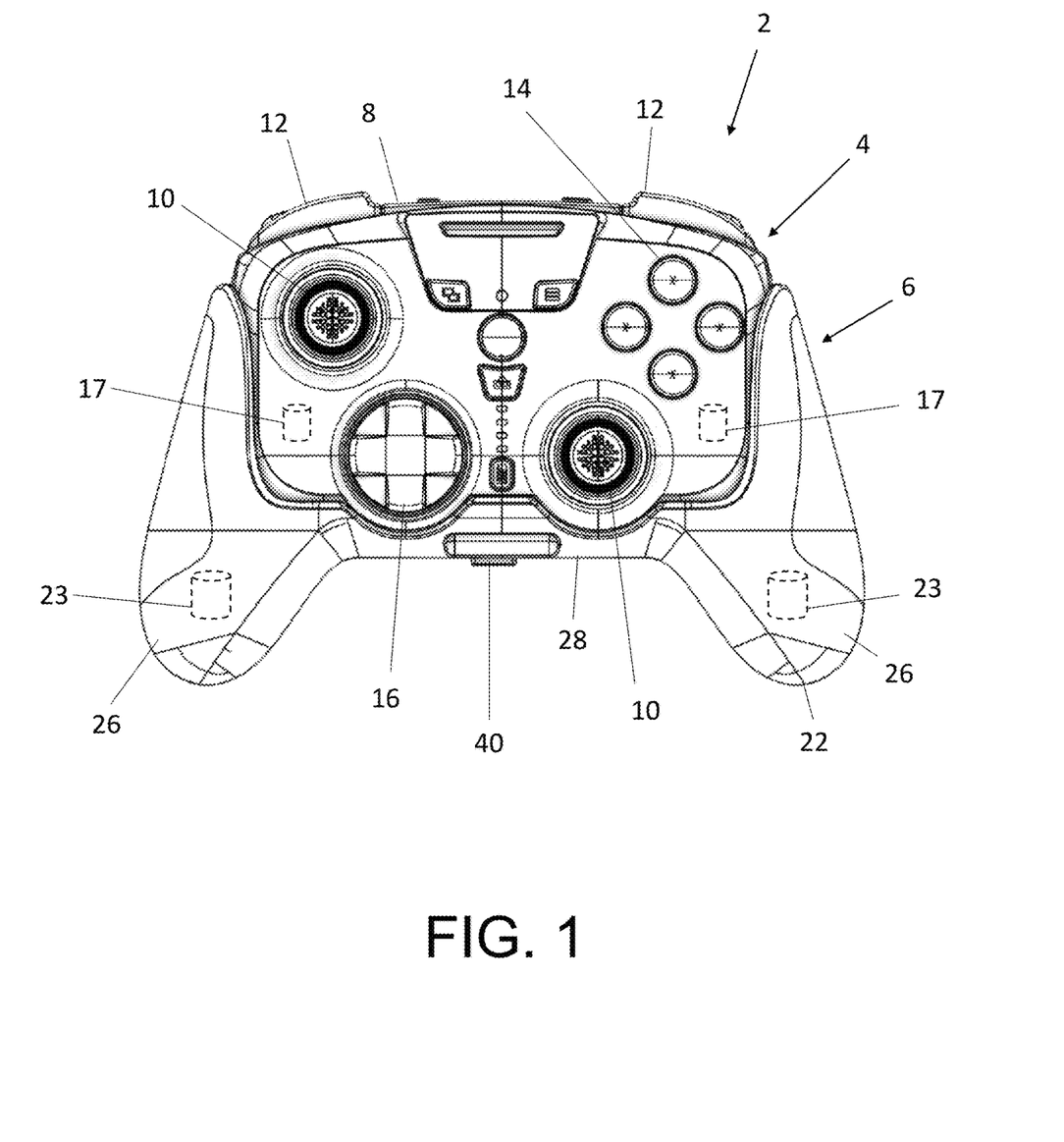
FIG. 1 illustrates a front view of an exemplary mobile game controller and full feature game controller combination device.
Figure 2:
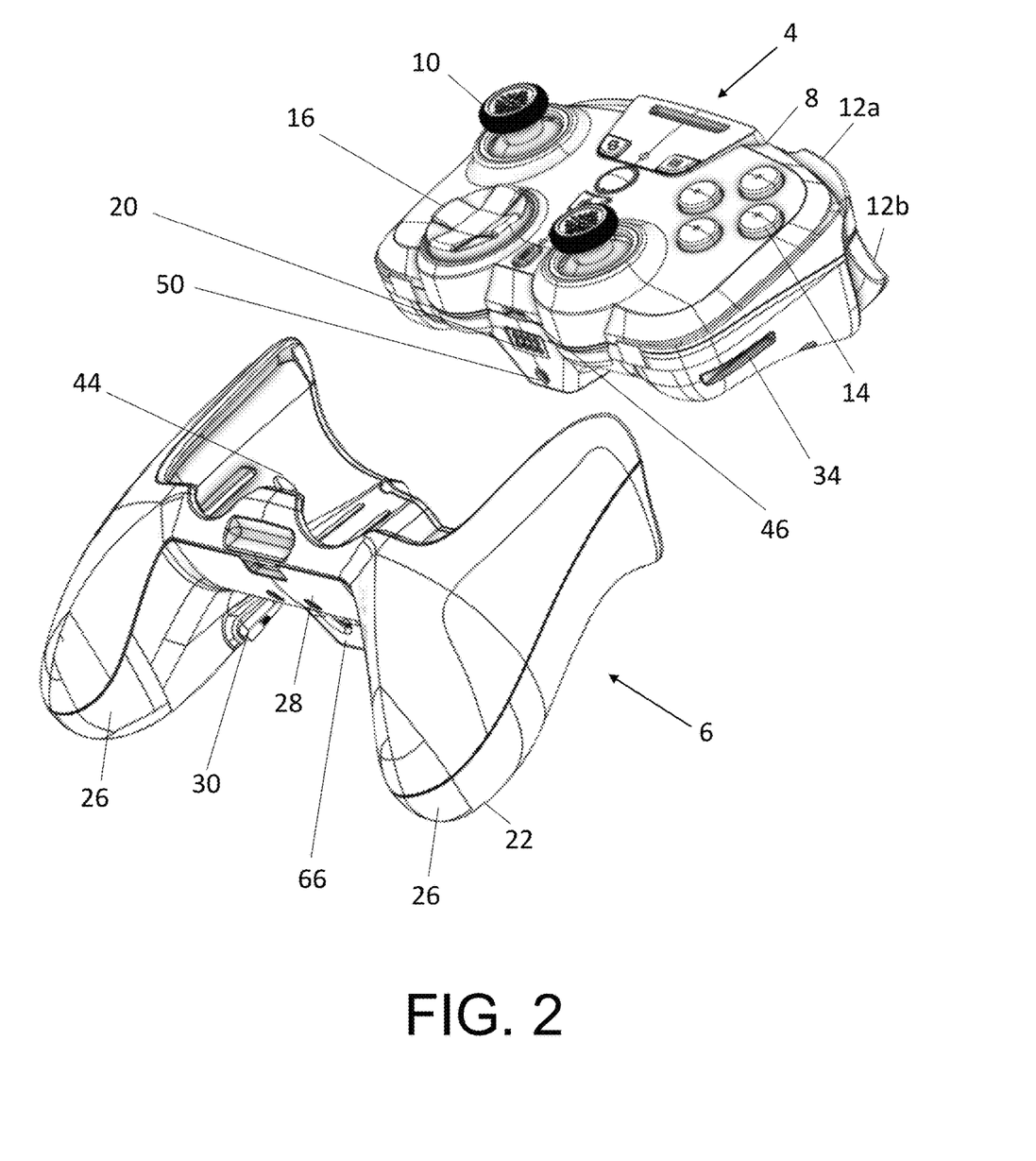
FIG. 2 illustrates an exploded perspective view of the mobile game controller and full feature game controller combination device of FIG. 1.

FIGS. 1-4 illustrate an exemplary mobile game controller and full feature game controller combination device 2 comprising a first unit 4 and a second unit 6. When in a combined configuration (as shown in FIG. 1) the combination device 2 may act as an at home full feature game controller. However, when the first unit 4 is separated from the second unit 6 (as shown in FIG. 2), the first unit 4 may act as a mobile video game controller.

The first unit 4 includes a first body 8. Operatively installed to the first body 8 may be at least one analog stick 10, at least two trigger buttons 12 (which may include shoulder trigger inputs 12a and lower trigger inputs 12b), at least one action button 14, and at least one directional pad 16. The analog stick 10, trigger buttons 12, action button 14, and directional pad 16 of the first unit 4 may serve as a first control interface between the controller's user and a desired video game. Furthermore, the control interface of the first unit 4 may include one or more first rumble motors 17 (shown ghosted in FIG. 1) or other haptic feedback device disposed within the first body 8. In the embodiments depicted in the exemplary device in FIGS. 1-4 the control interface of the first body 8 includes two analog sticks 10, two trigger buttons 12, a plurality of action buttons 14, and one directional pad 16. In other embodiments, the control interface may include other types of control devices (e.g., track ball, voice controller, etc.) or may include different combinations of the control devices disclosed herein and other types of control devices. The control interface may be mapped and reprogramed to control the video game as desired.

The first unit 4 may also include a processor 702 (shown in FIG. 7) disposed within the first body 8. The processor 702 may be implemented as one or more processors. The processor 702 may be operatively connected to a gaming device (e.g., a video game console, personal computer, laptop, mobile device, tablet, Smart TV, streaming device, etc.) and the control interface (including analog stick 10, trigger buttons 12, action button 14, directional pad 16, rumble motors 17, etc.) to receive user input and output user feedback. The processor 702 may communicate with the gaming device via a wired (input port 62) or a wireless connection. The control interface may receive user input and transmit it to the processor 702 which communicates with the gaming device to control a video game. The processor 702 may receive video game feedback from the gaming device and may cause the one or more rumble motors 17 to vibrate to provide haptic feedback to the user.

The first unit 4 may also include a first communication port 20 operatively mounted to the first body 8. The first communication port 20 may be operatively connected to the processor 702. In the illustrated embodiment, the communication port 20 is disposed on the bottom surface of the first body 8. In other embodiments, the communication port 20 may be disposed on other surfaces of the first body 8 such as the backside or sides of the first body 8. In other embodiments, the communication port 20 may be a wireless communication port.

Figure 3:
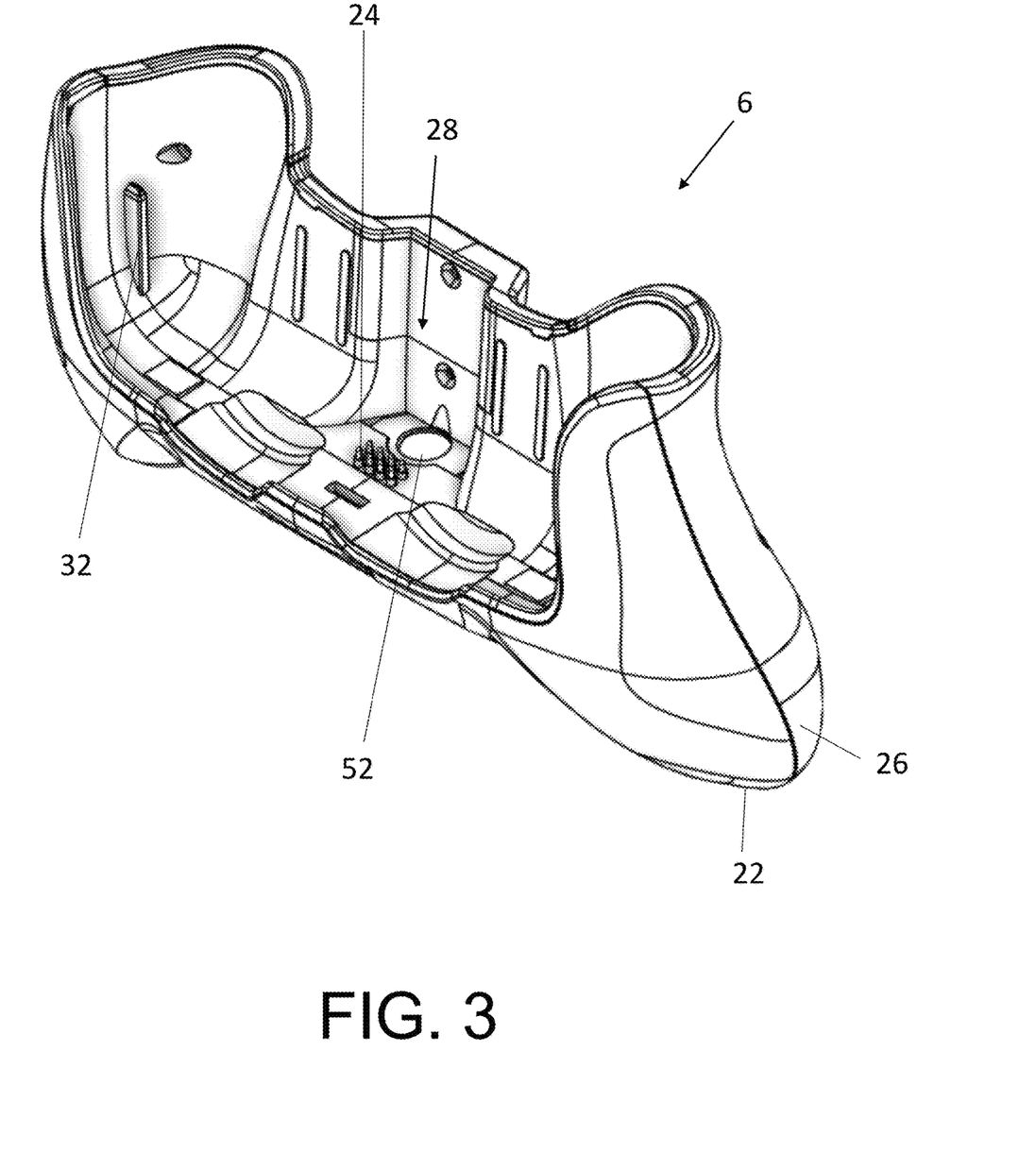
FIG. 3 illustrates a perspective view of an exemplary second unit of the exemplary mobile game controller and full feature game controller combination device of FIG. 1.
Figure 4:
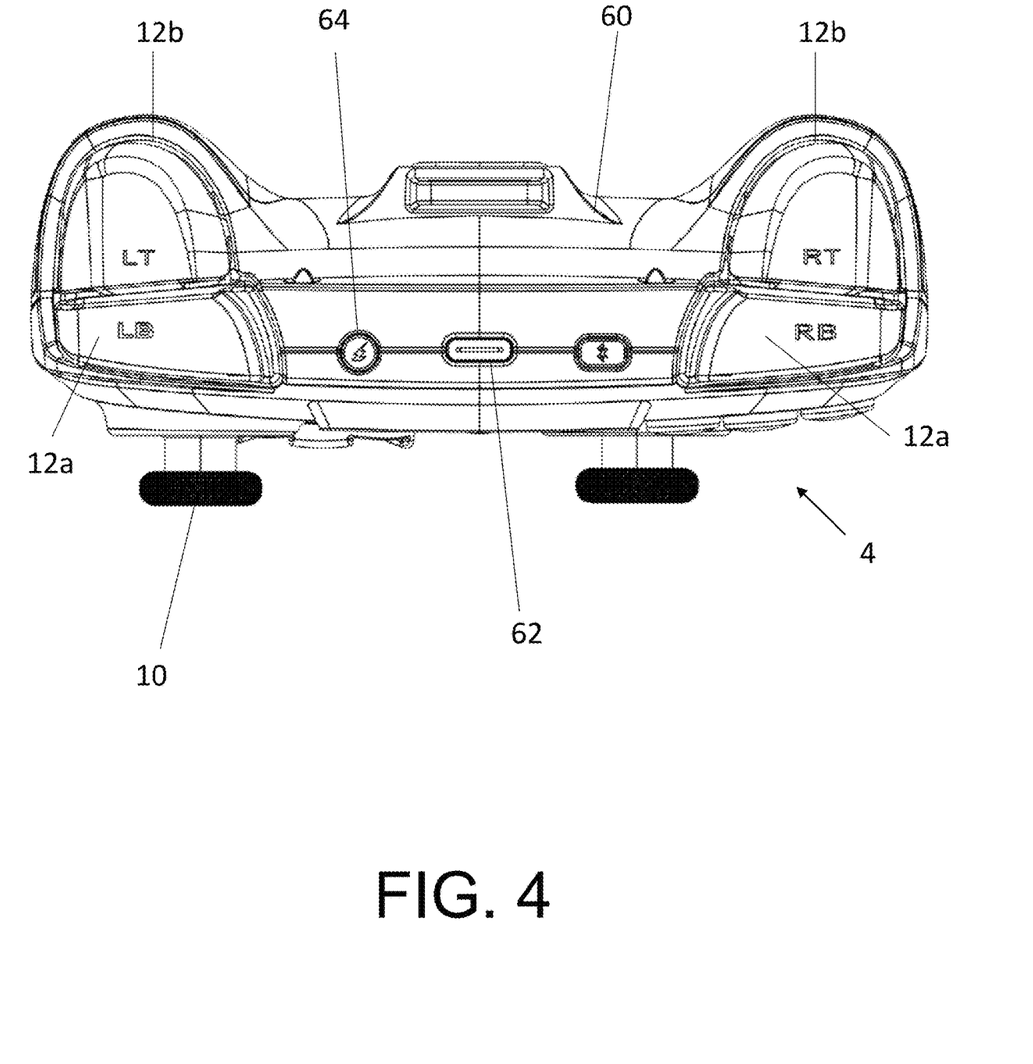
FIG. 4 illustrates a top view of the first unit of the mobile game controller and full feature game controller combination device of FIG. 1.

The second unit 6 includes a second body 22. The second body 22 is separate form the first body 8. The second unit 6 may include one or more second rumble motors 23 (shown ghosted in FIG. 1) operatively installed to and disposed within the second body 22. The second unit 6 may also include one or more advance gaming buttons 30. The advance gaming buttons 30 may be disposed along the second body 22. The second body 22 may further include a second communication port 24 that is operatively mounted to the second body 22. The second communication port 24 may be configured to communicatively connect to the first communication port 20 such that the processor 702 effectively controls the one or more second rumble motors 23 to vibrate to provide haptic feedback to the user and the advance gaming buttons 30 to provide additional user inputs. Thus, the rumble motors 23, the advance gaming buttons 30 and any other control device of the second unit 6 may serve as a second control interface between the user of the controller 2 and a desired video game when the second unit 6 is connected to the first unit 4.

The first and second communication ports 20, 24 may be comprised of a first and second electrical connector, such as, for example, a plug and socket electrical connector, as shown, configured to connect to each other. However, it is to be appreciated that any suitable electrical connector may be utilized. In other embodiments, the first and second communication ports 20, 24 may include first and second wireless communication devices. The first and second wireless communication devices may be comprised of Wi-Fi, Bluetooth, Infrared wireless connection, induction wireless connection, or any other suitable wireless communication devices. In those embodiments, the second wireless communication device is configured to wirelessly connect to the first wireless communication device.

In an embodiment the first unit 4 may be configured such that, when operated by itself, it operates as a mobile video game controller. The first body 8 of the first unit 4 may be configured such that it has a substantially rectangular shape that is relatively compact so that the first unit 4 may be easily stored and transported. The first body 8 may be shaped in other suitable configurations such as ovular, circular, or triangular, etc. as long as it remains relatively compact.

The second body 22 of the second unit 6 may resemble a grip portion of a conventional video game controller such that, when the second body 22 is installed to the first body 8, the resulting device 2 has an ergonomically correct shape to accommodate the hands of a user. The second body 22 may, for example, have two extending handhold members or wings 26. The wings 26 may be connected to one another via a central potion 28. The central portion 28 may have a cavity that is complementary to the first body 8 to receive the first body 8 and allow the second body 22 to couple to the first body 8. When the first body 8 is coupled to the second body 22 such that it is fully received with the central portion 28, the combination controller device 2 resembles a full featured game controller.

In one embodiment, the first body 8 may removably engage and connect to the second body 22 by a mechanical retaining structure. For example, the mechanical retaining structure may include at least one tongue 32 disposed within the central portion 28 of the second body 22. The at least one tongue 32 may be disposed on an interior surface of the central portion 28. The at least one tongue 32 is configured to engage an at least one receiving groove or slot 34 in the first body 8. The at least one receiving groove 34 may be disposed on a side wall of the first body 8. However, at least one receiving groove 34 may be disposed anywhere along the first body 8 so long as it corresponds with the at least one tongue 32 of the second body 22. Other suitable mechanical retaining structures are possible. The combination device 2 may include a securing mechanism or lock 40 to ensure the first body 8 does not accidentally disengage from the second body 22. For example, the securing mechanism 40 may be a slide lock comprised of a slidable engagement feature protruding portion 44 disposed in the second body 22 and a slidable engagement feature receiving portion 46 in the first body 8. The engagement feature may be engaged and disengaged by sliding it to a locked position and to an unlocked position. Any other suitable means of locking may be used for securing the first body 8 to the second body 22.

Coupling the first communication port 20 to the second communication 24 port may configure the processor 702 to effectively control the one or more second rumble motors 23. In one embodiment, coupling the first communication port 20 to the second communication 24 port configures the processor 702 to control the second rumble motors 23 instead of or in addition to the first rumble motors 17 to provide haptic feedback to the user at a higher intensity and/or lower frequency compared to an intensity and/or frequency provided to the user by the mobile video game controller 4 alone. In an embodiment, when the first body 8 and second body 22 are coupled together via the first communication port 20 and second communication port 24, the processor 702 communicates with the first unit 4 and second unit 6 to cease operating (e.g., turn off) the one or more first rumble motors 17 in the first body 8 and begin operating (e.g., turn on) the one or more second rumble motors 23 in the second body 22. In another embodiment, when the first body 8 and second body 22 are coupled together via the first and second communication port 20, 24, the connection causes the processor 702 to initiate control of the one or more second rumble motors 23 and to continue operation of the one or more first rumble motors 17.

In another embodiment, the first unit 4 may include a microphone configured on the first body 8. The microphone may communicate with the processor to relay audio inputs to a video game.

In another embodiment, the first unit 4 may include an audio input/output port 50 disposed along the bottom side of the first body 8 to receive a wired headphone or headphone/microphone combination connection. For example, the audio input/output port 50 may be a 3.5-millimeter (mm) audio input jack or other suitable input/output port for a wired audio connection. The second unit 6 may also include an aperture 52 disposed along the bottom side of the second body 22 such that its location corresponds with the location of the audio input/output port 50 of the first body 8 so the port 50 may be accessed.

In another embodiment, the first unit 4 may include a first power supply 60 disposed in the first body 8. The first power supply 60 may include, for example, a rechargeable battery, or any other suitable means for providing power to the first unit 4. Furthermore, when the first unit 4 and second unit 6 are coupled together to form the full feature combination device 2, the first power supply 60 may power the second unit 6. The first body 8 may include a charging input 62 to charge the batteries of the first power supply 60. The charging input 62, for example, may be any suitable means of charging such as USB-C, micro-USB, etc. The charging input 62 may power the first device 2 when connected to an external power supply by a charging cable. The input 62 may additionally serve as the wired interface between the device 2 and the gaming device (e.g., console, PC, etc.) Furthermore, the first body 8 may include an indicator light 64 for indicating that the first power supply 60 is charging. In another embodiment, the second unit 6 may include a second power supply. In one embodiment, the second power supply may provide a backup power supply to the first power supply 60.

Figure 5:
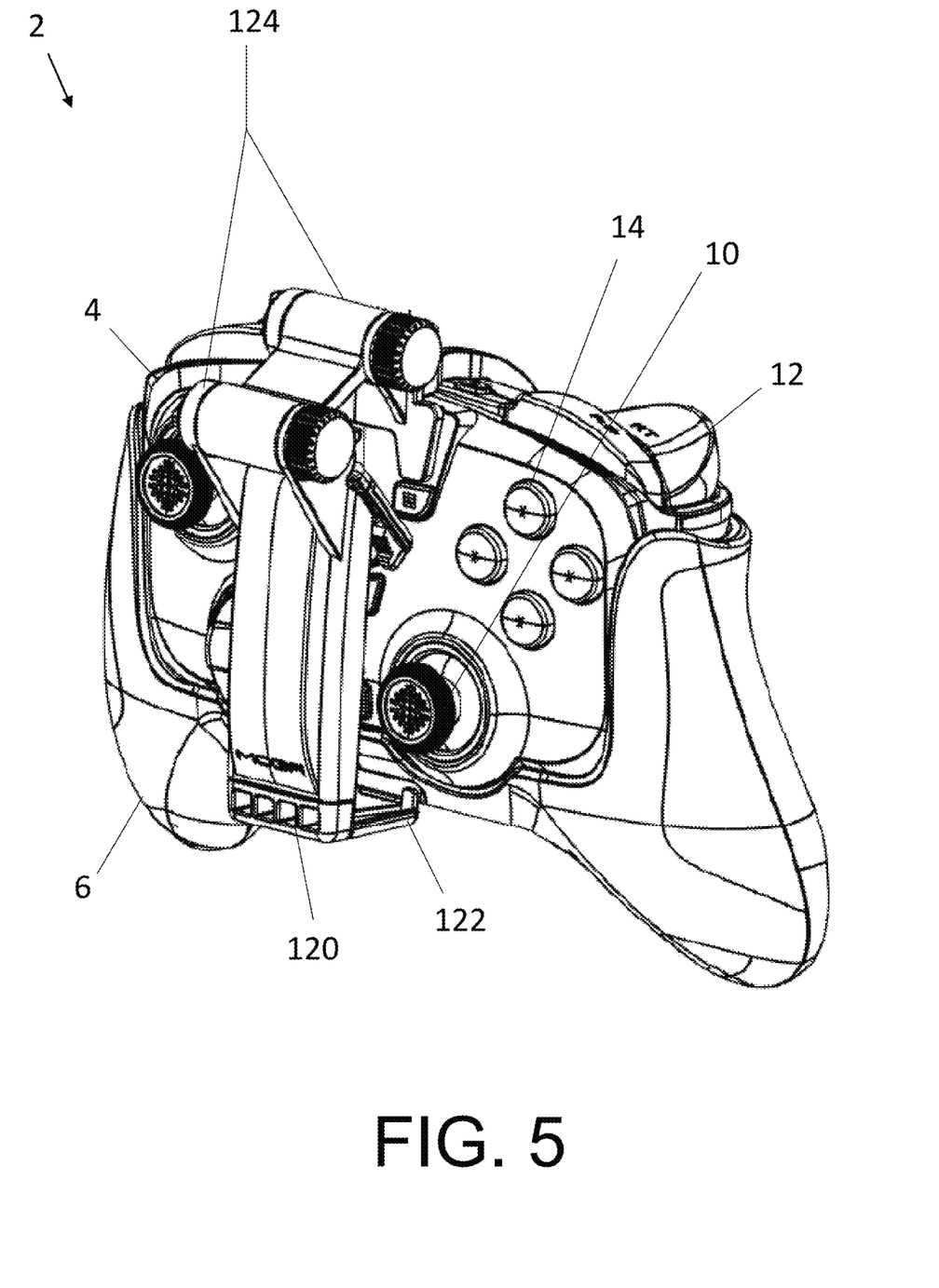
FIG. 5 illustrates a perspective view of another exemplary video game controller set.

In the embodiment of FIG. 5, the video game controller device 2 includes a mobile device clip 120 that includes a clamp 122 for securing a mobile device (e.g., smart phone, tablet, etc.) to the device 2. The mobile device clip 120 may include rotational elements 124 such that a user may adjust the orientation of the mobile device mounted to the clip 120. The mobile device clip 120 may be configured such that it is removably attached from the device 2.

Figure 6:
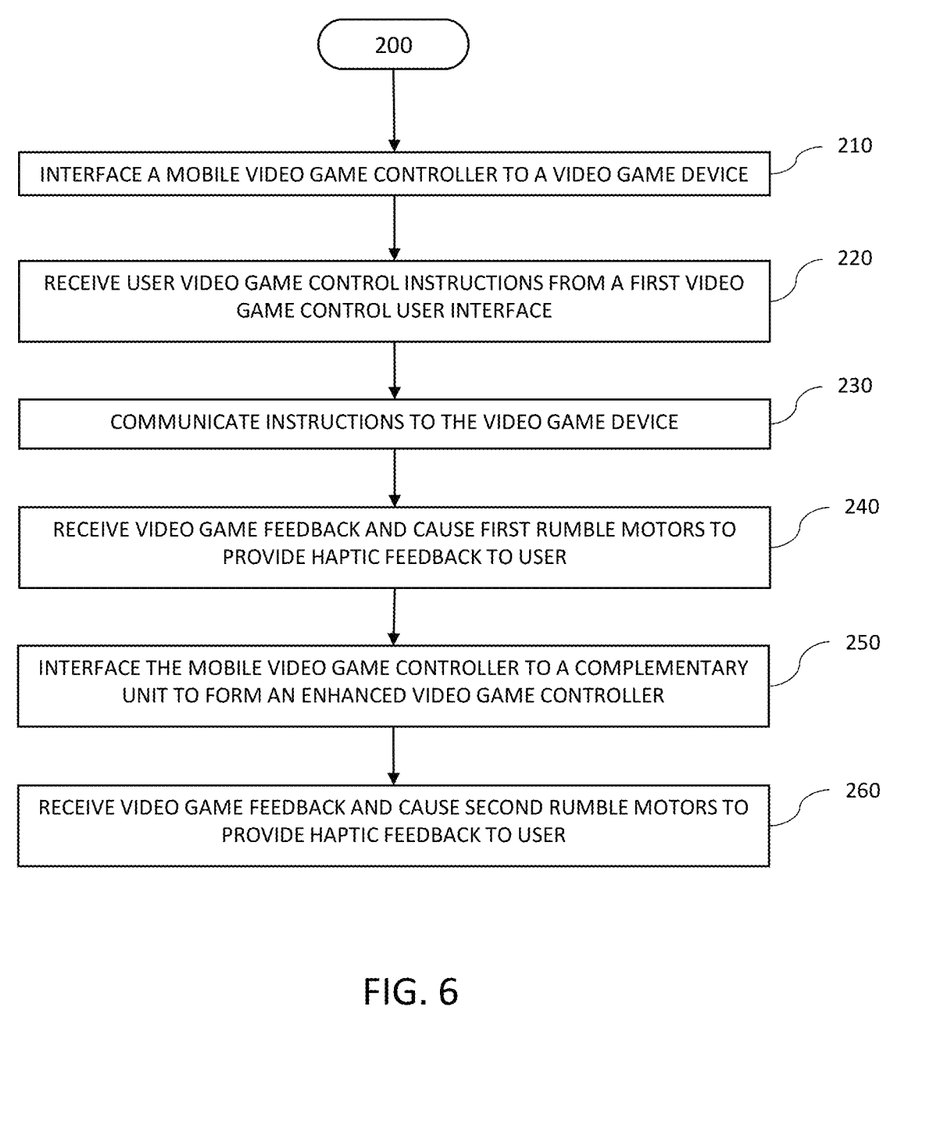
FIG. 6 illustrates a flow diagram for an exemplary method for controlling a video game.

Exemplary methods may be better appreciated with reference to the flow diagram of FIG. 6. While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an exemplary methodology. Furthermore, additional methodologies, alternative methodologies, or both can employ additional blocks, not illustrated.

In the flow diagrams, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagrams illustrate functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

FIG. 6 illustrates a flow diagram for an exemplary method 200 for controlling a video game. At 210, the method 200 may include interfacing a mobile video game controller to a video game device. At 220, the method 200 includes receiving user video game control instructions from a first video game control user interface including one or more of a) an analog stick, b) a trigger button, c) an action button, and d) a directional pad. At 230, the method 200 includes communicating computer video game control instructions corresponding to the user video game control interface to the video game device. At 240, the method 200 includes receiving video game feedback and causing one or more first rumble motors to vibrate based on the video game feedback to provide haptic feedback to the user. At 250, the method 200 includes interfacing the mobile video game controller to a complementary unit to form an enhanced video game controller. At 260, the method 200 includes receiving video game feedback and causing one or more second rumble motors to vibrate based on the video game feedback to provide enhanced haptic feedback to the user at a higher intensity and/or lower frequency compared to an intensity and/or frequency provided to the user by the mobile video game controller alone.

In one embodiment, interfacing the mobile video game controller to the complementary unit results in the enhanced video game controller being ergonomically correct to accommodate hands of a user.

In one embodiment, interfacing the mobile video game controller to the complementary unit includes mechanically coupling the mobile video game controller and the complementary unit.

In one embodiment, interfacing the mobile video game controller to the complementary unit further includes mechanically and data communicatively coupling the mobile video game controller and the complementary unit resulting in the enhanced video game controller being ergonomically correct to accommodate hands of a user and the user receiving the enhanced haptic feedback.

In one embodiment, interfacing the mobile video game controller to the complementary unit further includes making an electrical connection between the mobile video game controller and the complementary unit.

In one embodiment, interfacing the mobile video game controller to the complementary unit includes making a wireless connection between the mobile video game controller and the complementary unit.

In one embodiment, interfacing the mobile video game controller to the complementary unit initiates control of the one or more second rumble motors.

Figure 7:
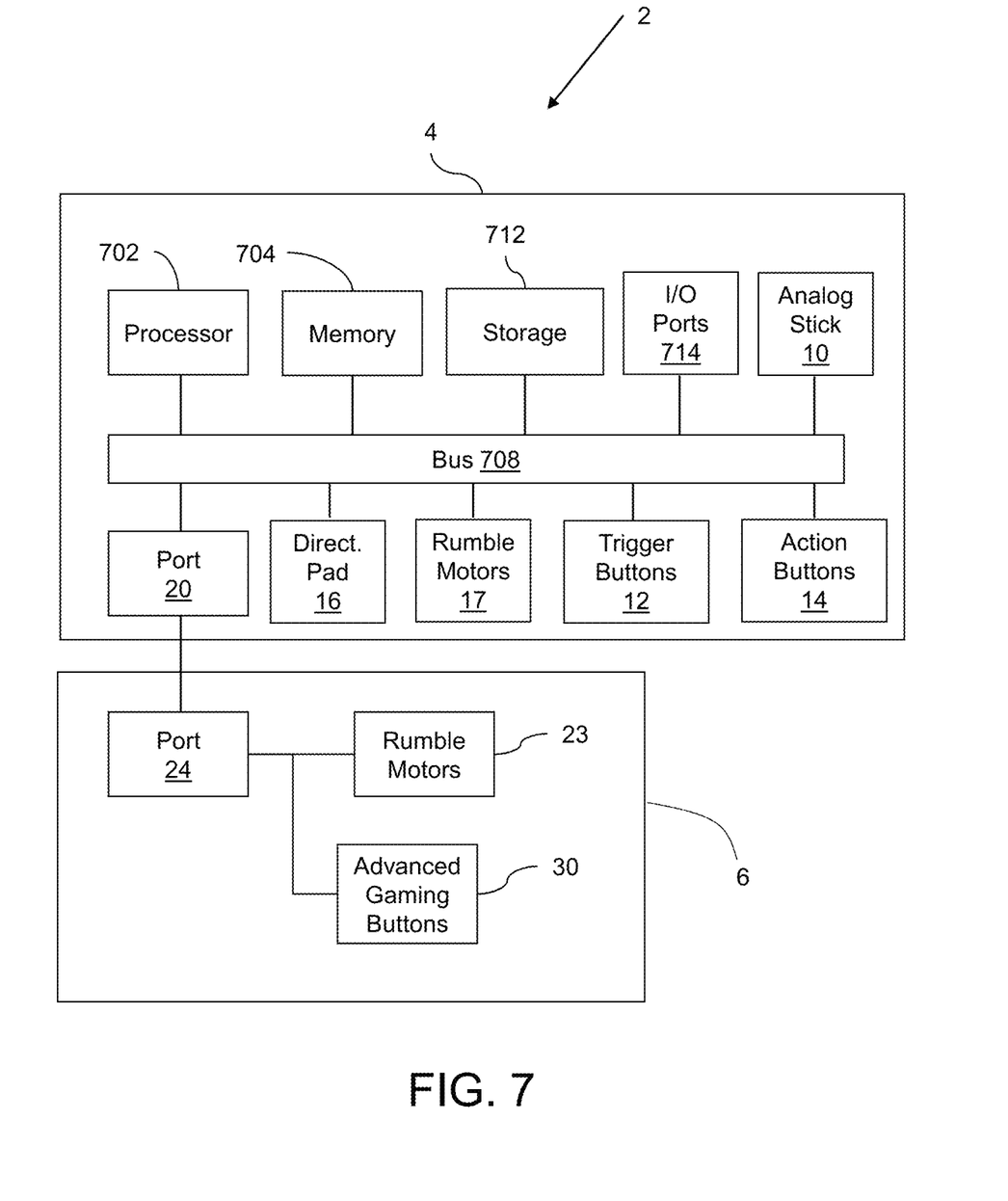
FIG. 7 illustrates a block diagram of an exemplary mobile game controller and full feature game controller combination device.

FIG. 7 illustrates a block diagram of an exemplary full feature game controller combination device 2. The device 2 includes a processor 702, a memory 704, the port 20, and a storage 712 operably connected by a bus 708.

In one example, the device 2 may transmit input and output signals as described above via, for example, ports 20, 24. The device 2 may also communicate with a gaming device via I/O Ports 714. The device 2 may receive user input via the analog stick 10, trigger buttons 12, action buttons 14, directional pad 16, advance gaming buttons 30, etc. and transmit user input signals to the gaming device via the I/O Ports 714. Similarly, the device 2 may receive user feedback signals from the gaming device via I/O Ports 714 and transmit user feedback via the rumble motors 17 and 23.

The processor 702 can be a variety of various processors including dual microprocessor and other multi-processor architectures. The memory 704 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM). The storage 712 may be operably connected to the processor 702 via the bus 708. The storage 712 can include, but is not limited to, devices like a magnetic disk drive, a solid-state disk drive, a flash memory card, or a memory stick. The memory 704 can store processes or data. The storage 712 or memory 704 can store an operating system that controls and allocates resources of the device 2.

The bus 708 can be a single internal bus interconnect architecture or other bus or mesh architectures. While a single bus is illustrated, it is to be appreciated that device 2 may communicate with various devices, logics, and peripherals using other busses that are not illustrated (e.g., PCIE, SATA, Infiniband, 1394, USB, Ethernet). The bus 708 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The device 2 may interact with input/output devices via I/O Ports 714. Input/output devices can include, but are not limited to, a keyboard, a microphone, a pointing and selection device, cameras, video cards, displays, gaming devices, and the like. The I/O Ports 714 can include but are not limited to, serial ports, parallel ports, and USB ports. The device 2 can operate in a network environment and thus may be connected to network devices via the I/O Ports 714. Through the I/O Ports 714, the device 2 may interact with a network. Through the network, the device 2 may be logically connected to remote devices. The networks with which the device 2 may interact include, but are not limited to, a local area network (LAN), a wide area network (WAN), and other networks. The I/O Ports 714 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the I/O Ports 714 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

DEFINITIONS

The following includes definitions of selected terms employed herein. The definitions include various examples or forms of components that fall within the scope of a term and that may be used for implementation. The examples are not intended to be limiting. Both singular and plural forms of terms may be within the definitions.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A mobile game controller and full feature game controller combination device, comprising:
   a first unit including:
      a first body,
      at least one analog stick, at least two trigger buttons, at least one action button, at least one directional pad, and one or more first rumble motors operatively installed to the first body,
      one or more processors disposed in the first body and configured to operatively connect to a gaming device and operatively connected to the at least one analog stick, the at least two trigger buttons, the at least one action button, the at least one directional pad, and the one or more rumble motors to receive user input via the at least one analog stick, the at least two trigger buttons, the at least one directional pad, and the at least one action button and control a video game executed by the gaming device and to receive video game feedback and cause the one or more rumble motors to vibrate to provide haptic feedback to the user, and
      a first communication port operatively mounted to the first body and operatively connected to the one or more processors;
   a second unit including:
      a second body separate from the first body, wherein the second body has a shape complementary of a shape of the first body for coupling of the second body to the first body
      one or more second rumble motors operatively installed to the second body, and
      a second communication port operatively mounted to the second body and configured to communicatively connect to the first communication port such that the one or more processors effectively controls the one or more second rumble motors to vibrate to provide enhanced haptic feedback to the user.

2. The mobile game controller and full feature game controller combination device of claim 1, wherein the second body has an ergonomically correct shape to accommodate hands of a user.

3. The mobile game controller and full feature game controller combination device of claim 1, wherein the second body has a shape complementary of a shape of the first body such that coupling of the second body to the first body resembles a full feature game controller.

4. The mobile game controller and full feature game controller combination device of claim 1,
   wherein the first body has a substantially rectangular shape and the second body has an ergonomically correct shape to accommodate hands of a user, wherein the second body has a shape complementary of the shape of the first body such that coupling of the second body to the first body resembles a full feature game controller.

5. The mobile game controller and full feature game controller combination device of claim 1, wherein the first communication port includes a first electrical connector and the second communication port includes a second electrical connector configured to connect to the first electrical connector.

6. The mobile game controller and full feature game controller combination device of claim 1, wherein the first communication port includes a first wireless communication device and the second communication port includes a second wireless communication device configured to wirelessly connect to the first wireless communication device.

7. The mobile game controller and full feature game controller combination device of claim 1, wherein coupling the first communication port to the second communication port configures the one or more processors to effectively control the one or more second rumble motors to vibrate and coupling the first body to the second body configures the one or more second rumble motors to provide haptic feedback to the user at a higher intensity and/or lower frequency compared to an intensity and/or frequency provided to the user by the one or more first rumble motors alone.

8. The mobile game controller and full feature game controller combination device of claim 1, wherein coupling the first body to the second body causes the one or more processors to initiate control of the one or more second rumble motors and to cease operation of the one or more first rumble motors.

9. The mobile game controller and full feature game controller combination device of claim 1, wherein coupling the first body to the second body causes the one or more processors to initiate control of the one or more second rumble motors and to continue operation of the one or more first rumble motors.

10. A video game controller kit, comprising:
    a mobile video game controller including:
       a first body,
       a first video game control user interface including one or more of a) an analog stick, b) a trigger button, c) an action button, and d) a directional pad and one or more first rumble motors operatively installed to the first body,
       one or more processors disposed in the first body and configured to operatively connect to a gaming device and operatively connected to the first video game control user interface to receive user input and control a video game executed by the gaming device and to receive video game feedback and cause the one or more first rumble motors to vibrate to provide haptic feedback to the user, and
       a first communication port operatively mounted to the first body and operatively connected to the one or more processors;
    a complementary unit including:
       a second body separate from the first body, wherein the second body has a shape complementary of a shape of the first body for coupling of the second body to the first body,
       a second video game user interface including one or more second rumble motors operatively installed to the second body, and
       a second communication port operatively mounted to the second body and configured to communicatively connect to the first communication port such that the one or more processors effectively controls the second video game user interface including causing the one or more second rumble motors to vibrate to provide enhanced haptic feedback to the user.

11. The video game controller kit of claim 10, wherein the second body has an ergonomically correct shape to accommodate hands of a user.

12. The video game controller kit of claim 10, wherein the second body has a shape complementary of a shape of the first body to accommodate coupling of the second body to the first body.

13. The video game controller kit of claim 10,
wherein the first body has a substantially rectangular shape and the second body has an ergonomically correct shape to accommodate hands of a user,
wherein the second body is configured to couple to the first body.

14. The video game controller kit of claim 10, wherein the first communication port includes a first electrical connector and the second communication port includes a second electrical connector configured to connect to the first electrical connector.

15. The video game controller kit of claim 10, wherein the first communication port includes a first wireless communication device and the second communication port includes a second wireless communication device configured to wirelessly connect to the first wireless communication device.

16. The video game controller kit of claim 10, wherein coupling the first communication port to the second communication port configures the one or more processors to effectively control the one or more second rumble motors to vibrate and coupling the first body to the second body configures the kit to provide haptic feedback to the user at a higher intensity and/or lower frequency compared to an intensity and/or frequency provided to the user by the mobile video game controller alone.

17. The video game controller kit of claim 10, wherein coupling the first body to the second body causes the one or more processors to initiate control of the one or more second rumble motors and to cease operation of the one or more first rumble motors.

18. The video game controller kit of claim 10, wherein coupling the first body to the second body causes the one or more processors to initiate control of the one or more second rumble motors and to continue operation of the one or more first rumble motors.

19. A video game controller set, comprising:
a video game controller including:
a first body,
a first video game control user interface including one or more first user input devices and one or more first user output devices operatively installed to the first body,
one or more processors disposed in the first body and configured to operatively connect to a gaming device and operatively connected to the first video game control user interface to receive user input via the one or more first user input devices to control a video game executed by the gaming device and to receive a feedback signal to cause the one or more first user output devices to provide feedback to the user, and
a first communication port operatively mounted to the first body and operatively connected to the one or more processors;
a complementary video game controller unit including:
a second body separate from the first body, wherein the second body has a shape complementary of a shape of the first body for coupling of the second body to the first body,
a second video game control user interface installed to the second body and including at least one or more of:
one or more second user input devices,
one or more second user output devices,
a second communication port operatively mounted to the second body and configured to communicatively connect to the first communication port such that the one or more processors effectively controls the second video game control user interface to at least one of (a) receive user input via the one or more second user input devices to control the video game executed by the gaming device, and (b) receive video game feedback to cause the one or more second user output devices to provide enhanced feedback to the user.

20. The video game controller set of claim 19, wherein the second body has an ergonomically correct shape complementary of a shape of the first body such that coupling of the first body and the second body results in an ergonomically correct set to accommodate hands of a user.

21. The video game controller set of claim 19, wherein the one or more second user input devices of the second video game control user interface include one or more advanced gaming buttons.

22. The video game controller set of claim 19, wherein the one or more second user output devices of the second video game control user interface include one or more rumble motors.

23. The video game controller set of claim 19, wherein the second video game control user interface includes both one or more second user input devices and one or more second user output devices, wherein the one or more second user input devices include one or more advanced gaming buttons and the one or more second user output devices include one or more rumble motors.

* * * * *